(12) United States Patent
Walsh

(10) Patent No.: US 7,512,405 B2
(45) Date of Patent: Mar. 31, 2009

(54) LOCATION PRIVACY MANAGER FOR A WIRELESS COMMUNICATION DEVICE AND METHOD THEREFOR

(75) Inventor: Patrick Jay Walsh, Bloomingdale, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

(21) Appl. No.: 10/686,553

(22) Filed: Oct. 14, 2003

(65) Prior Publication Data

US 2004/0131036 A1   Jul. 8, 2004

Related U.S. Application Data

(63) Continuation of application No. 09/497,955, filed on Feb. 4, 2000, now Pat. No. 6,662,014.

(51) Int. Cl.
*H04Q 7/20* (2006.01)

(52) U.S. Cl. .............. 455/456.1; 455/456.2; 455/456.3; 455/456.6; 455/411; 370/338

(58) Field of Classification Search ................. 455/410, 455/411, 414, 415, 456, 445, 456.1, 456.2, 455/456.3, 456.6; 370/338, 331, 329
See application file for complete search history.

(56) References Cited

U.S. PATENT DOCUMENTS

| | | | |
|---|---|---|---|
| 3,906,166 A | 9/1975 | Cooper et al. | |
| 5,305,370 A | 4/1994 | Kearns et al. | |
| 5,345,448 A | 9/1994 | Keskitalo | |
| 5,388,147 A | 2/1995 | Grimes | |
| 5,479,482 A | 12/1995 | Grimes | |
| 5,724,660 A | 3/1998 | Kauser et al. | |
| 5,729,537 A | 3/1998 | Billstrom | |
| 5,736,964 A | 4/1998 | Ghosh et al. | |
| 5,873,040 A | 2/1999 | Dunn et al. | |
| 5,890,068 A | 3/1999 | Fattouche et al. | |
| 5,930,717 A | 7/1999 | Yost et al. | |
| 5,940,515 A | 8/1999 | Kasavaraju | |
| 5,945,948 A | 8/1999 | Buford et al. | |
| 5,963,866 A | 10/1999 | Palamara et al. | |
| 5,987,329 A | 11/1999 | Yost et al. | |
| 6,011,973 A | 1/2000 | Valentine et al. | |
| 6,047,193 A | 4/2000 | Stovall et al. | |

(Continued)

*Primary Examiner*—David Q Nguyen
(74) *Attorney, Agent, or Firm*—Brinks Hofer Gilson & Lione

(57) ABSTRACT

Rules of communication are established between a wireless communication device (102) and a remote source (108). Communications between the wireless communication device (102) and the remote source (108) are managed to prohibit at least one of an identity and a location of the wireless communication device (102) from being known to the remote source (108) responsive to the established rules of communication. The steps of establishing and managing may be implemented in a wireless communication device (102), a wireless communication network (104), and/or a location privacy manager (106). The rules of communication preferably include a password generated by the remote source (108), an identity of the remote source (108), an identity of a location privacy manager (106), and/or masking of the identity of the wireless communication device (102). The wireless communication device (102) is preferably a cellular telephone device. The remote source (108) is preferably a location-enabled service, such as, for example, a map service, a people finder service, or a remote party.

17 Claims, 11 Drawing Sheets

U.S. PATENT DOCUMENTS

| | | | |
|---|---|---|---|
| 6,055,434 A | 4/2000 | Seraj | |
| 6,061,561 A | 5/2000 | Alanara et al. | |
| 6,070,078 A | 5/2000 | Camp, Jr. et al. | |
| 6,081,705 A | 6/2000 | Houde et al. | |
| 6,112,078 A | 8/2000 | Sormunen et al. | |
| 6,138,003 A * | 10/2000 | Kingdon et al. | 455/410 |
| 6,154,651 A | 11/2000 | Hicks et al. | |
| 6,198,923 B1 | 3/2001 | Buettner | |
| 6,253,075 B1 | 6/2001 | Beghtol et al. | |
| 6,275,693 B1 | 8/2001 | Lin et al. | |
| 6,292,657 B1 | 9/2001 | Laursen et al. | |
| 6,311,069 B1 | 10/2001 | Havinis et al. | |
| 6,321,092 B1 | 11/2001 | Fitch et al. | |
| 6,377,792 B1 | 4/2002 | Brown et al. | |
| 6,377,808 B1 | 4/2002 | Korneluk et al. | |
| 6,377,810 B1 | 4/2002 | Geiger et al. | |
| 6,389,291 B1 | 5/2002 | Pande et al. | |
| 6,393,003 B1 | 5/2002 | Lee | |
| 6,397,074 B1 | 5/2002 | Pihl et al. | |
| 6,405,027 B1 | 6/2002 | Bell | |
| 6,421,009 B2 | 7/2002 | Suprunov | |
| 6,442,391 B1 * | 8/2002 | Johansson et al. | 455/456.2 |
| 6,603,977 B1 | 8/2003 | Walsh et al. | |
| 6,662,014 B1 | 12/2003 | Walsh | |
| 6,675,017 B1 * | 1/2004 | Zellner et al. | 379/142.02 |
| 2002/0042280 A1 | 4/2002 | Allen, Jr. | |
| 2002/0049064 A1 | 4/2002 | Banno | |
| 2002/0068583 A1 | 6/2002 | Murray | |
| 2002/0077897 A1 * | 6/2002 | Zellner et al. | 705/14 |
| 2002/0094805 A1 | 7/2002 | Yano et al. | |

\* cited by examiner

Flowchart for the wireless communication device in Fig. 2

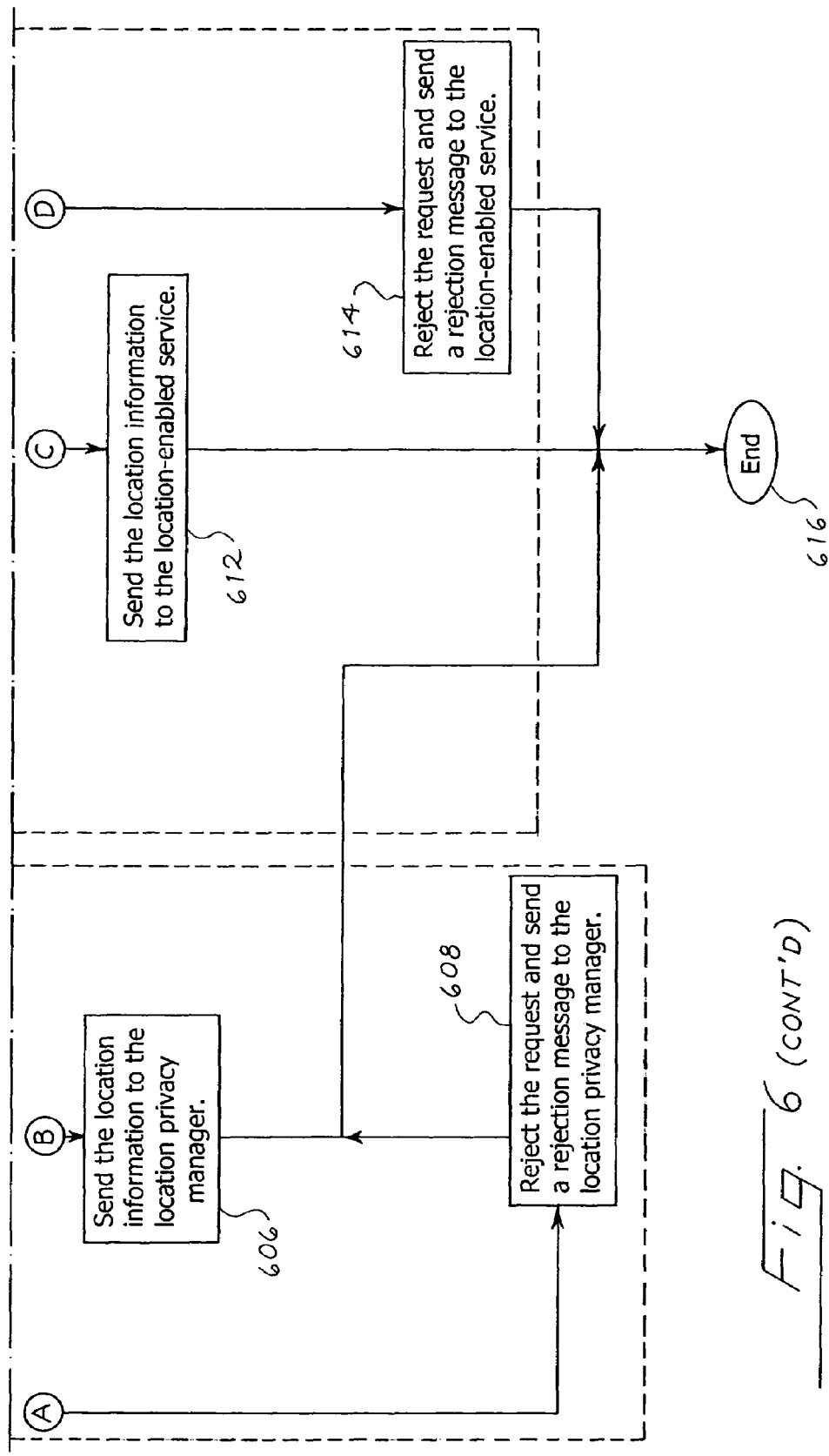

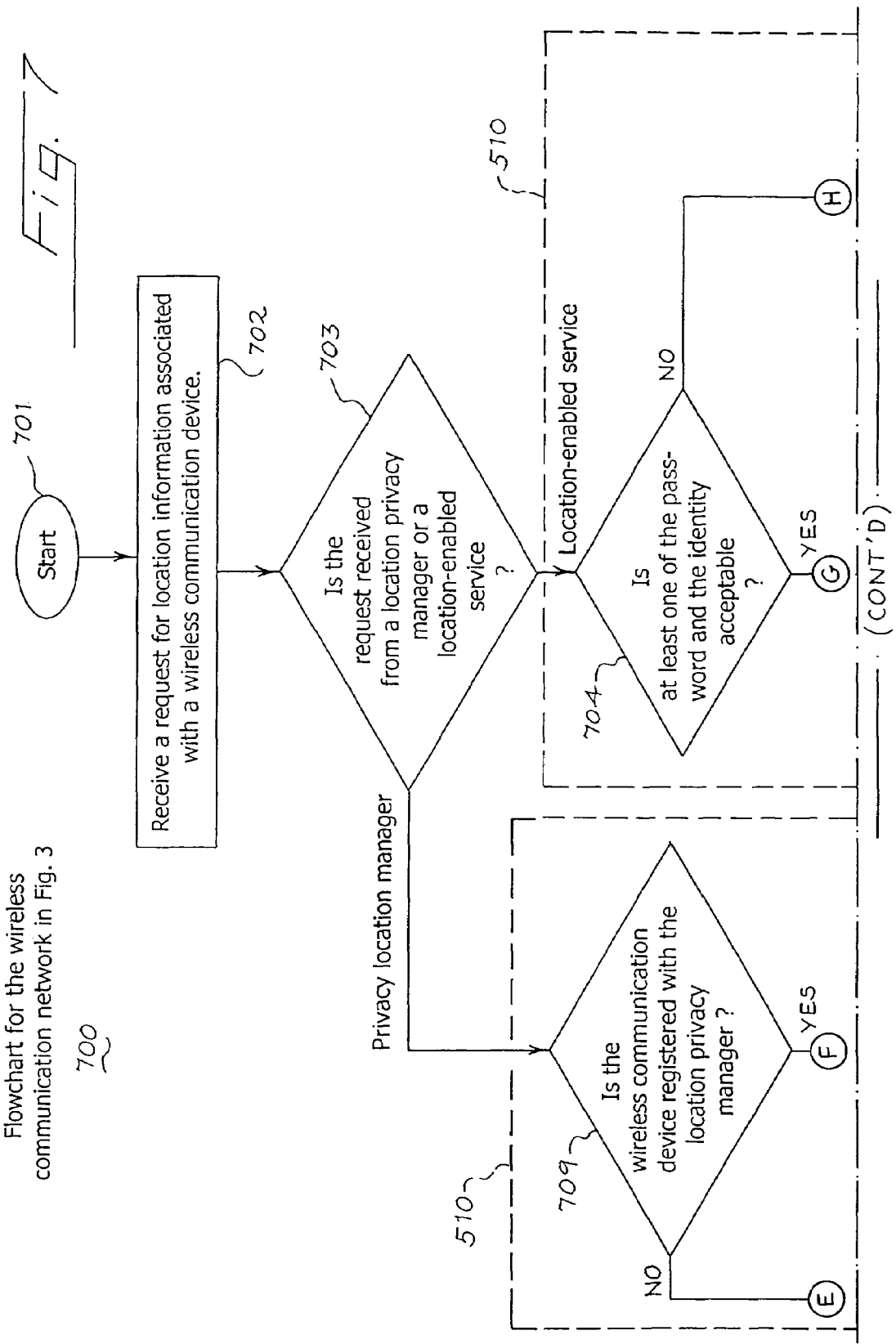

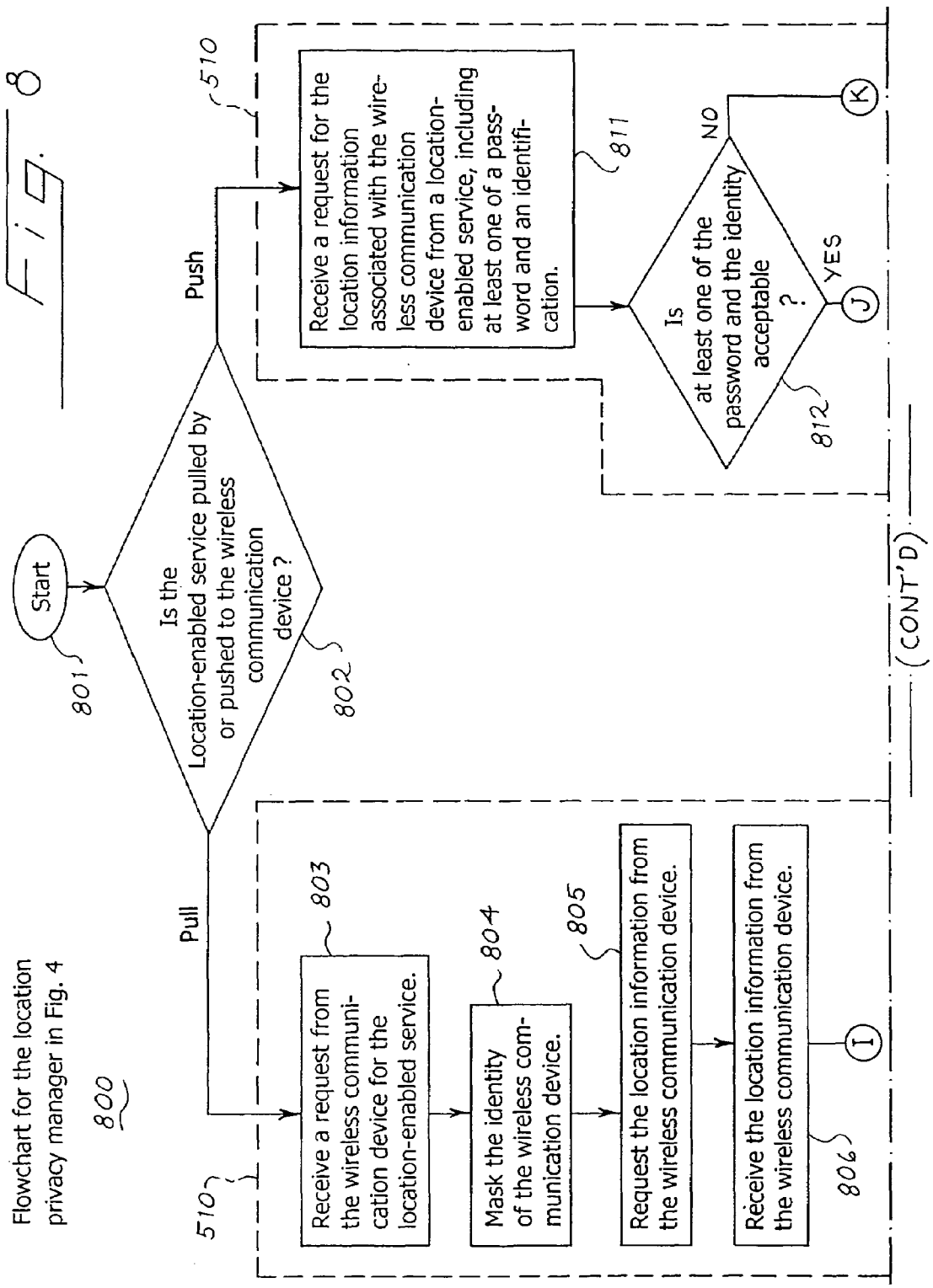

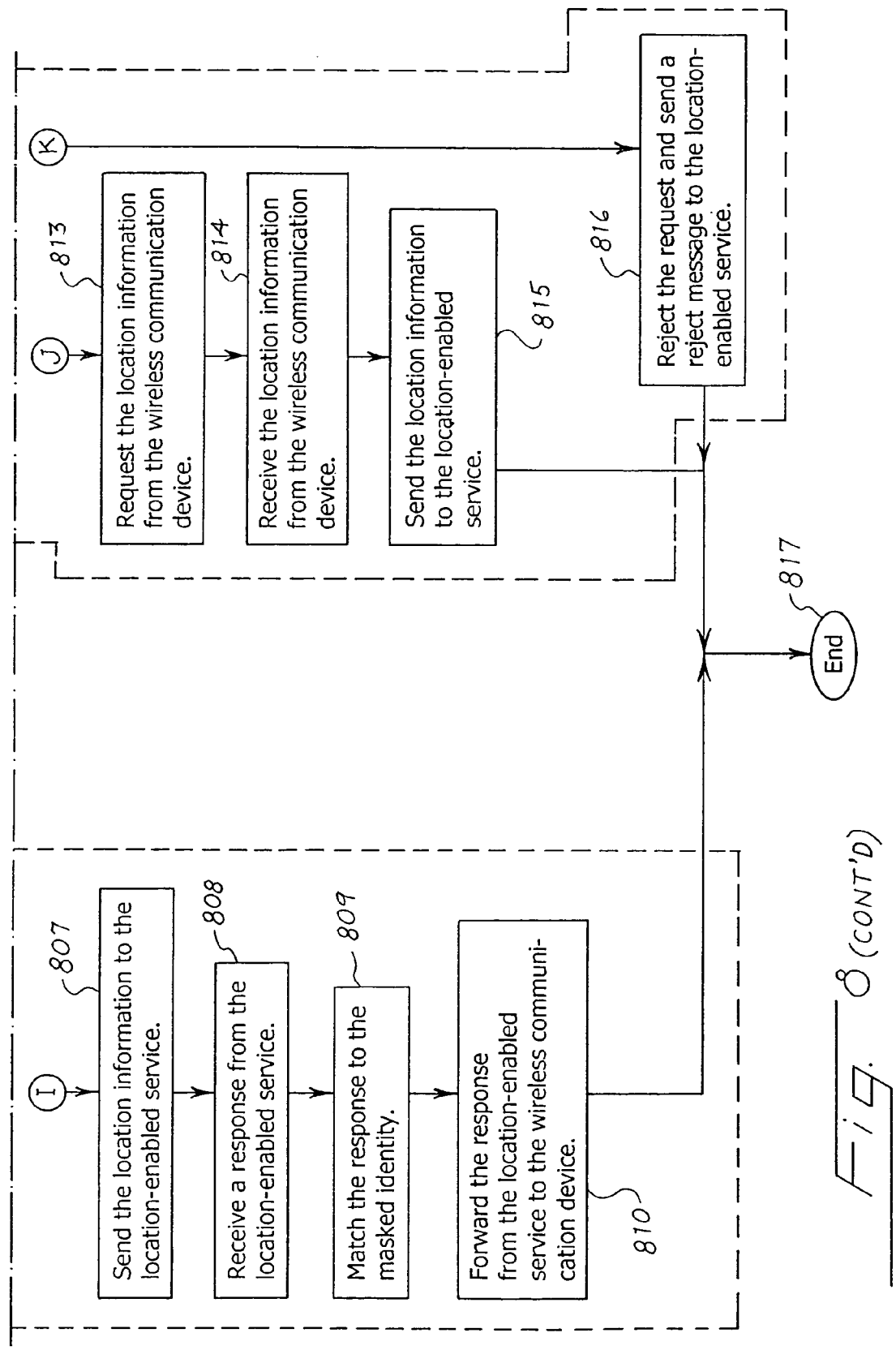

LOCATION PRIVACY MANAGER FOR A WIRELESS COMMUNICATION DEVICE AND METHOD THEREFOR

REFERENCE TO A RELATED APPLICATION

The present patent application is a continuation of U.S. application Ser. No. 09/497,955, filed Feb. 4, 2000 now U.S. Pat. No. 6,662,014. That application is assigned to the assignee of the present application and is hereby incorporated by reference. Also, the present patent application is related to U.S. Pat. No. 6,603,977, filed on Feb. 4, 2000 and assigned to the assignee of the present invention.

FIELD OF THE INVENTION

The present invention relates generally to location information systems, and more particularly to a location privacy manager for a wireless communication device and a method therefor.

BACKGROUND OF THE INVENTION

In the United States of America, the Federal Communications Commission (FCC) regulates wireless telecommunications companies that provide wireless telecommunications services. Wireless telecommunications is a group of telecommunications services under the heading of commercial mobile radio service (CMRS), as defined by the FCC. CMRS includes cellular, personal communications services (PCS), mobile satellite services (MSS) and enhanced specialized mobile radio (ESMR). Presently, CMRS does not include other forms of "wireless" communications such as paging and traditional dispatch. The FCC's authority over the wireless industry includes licensing, certain technical aspects of wireless service, timeframes in which service must be made available in given areas, and the provision of the 911 emergency answering service (i.e., 911 service), including basic 911 and enhanced 911 (i.e., E911).

The Department of Revenue of Washington State, USA provides an excellent summary of wireline and wireless 911 service in their document entitled: "Enhanced 911 Funding Study." This study is presently located at the internet web site: http://dor.wa.gov/index.asp?/pub/e911. The most relevant sections, including the executive summary, the introduction, chapter 1, chapter 2 text and drawings, and chapter 3 text and chart, have been printed out and provided with an information disclosure statement for the present patent application as a permanent reference to the present patent application. This entire study, including, but not limited to chapters 1, 2 and 3 along with the referenced drawings and charts, is herein incorporated into the present patent application by reference not only as a description for the background of the present invention, but also as a description for the detailed description of the present invention. Further, anything disclosed in this study, such as any term, concept, feature, service, drawing, chart, method, apparatus, system, etc. or portion thereof, may be used in combination with anything disclosed in the present patent application for support of any claims in the present or related patent applications.

The FCC requires that cellular telephones implementing E911 phase two must provide automatic location identification (ALI) to a public safety answering point (PSAP). To meet the ALI requirement a cellular network-based solution, a handset-based solution and a combination of a cellular-based solution and a handset-based solution have been proposed. Examples of cellular network-based solutions are disclosed in U.S. Pat. Nos. 5,890,068, 5,963,866, 5,987,329, 5,945,948, 5,930,717, 5,873,040, and 5,736,964. Examples of the handset-based solutions are disclosed in U.S. Pats. Nos. 5,479,482 and 5,388,147. An example of a combination solution is disclosed in U.S. Pat. No. 5,724,660.

Once the E911, phase two system is deployed, there will be a demand for location-based services and applications beyond the E911 service. However, it may not be safe or private to have the location of a cellular telephone known to strangers or third parties. For example, a mother would like to be able to locate her child using the location identification capability of the child's cellular telephone, but would not want other people to locate her child without her permission especially if her child is lost.

Accordingly, there is a need for a location privacy manager for a cellular telephone with location identification capability to provide safety and privacy for a user of the cellular telephone on a discretionary basis.

BRIEF DESCRIPTION OF THE DRAWINGS

FIG. 8 illustrates a flowchart describing a method performed by the privacy location manager illustrated in FIG. 4 in accordance with a preferred embodiment of the present invention.

DETAILED DESCRIPTION OF A PREFERRED EMBODIMENT

Generally, to meet the forgoing need, rules of communication are established between a wireless communication device 102 and a remote source 108. Communications between the wireless communication device 102 and the remote source 108 are managed to prohibit at least one of an identity and a location of the wireless communication device 102 from being known to the remote source 108 responsive to the established rules of communication. The steps of establishing and managing may be implemented in a wireless communication device 102, a wireless communication network 104, and/or a location privacy manager 106. The rules of communication preferably include a password generated by the remote source 108, an identity of the remote source 108, an identity of a location privacy manager 106, and/or masking of the identity of the wireless communication device 102. The wireless communication device 102 is preferably a cellular telephone device. The remote source 108 is preferably a location-enabled service, such as, for example, a map service, a people finder service, or a remote party. Hence, a user of the wireless communication device 102 advantageously receives increased privacy and security during the operation of the wireless communication device 102. Further features and advantages are described in the present detailed description of the preferred embodiment with reference to the drawings, as follows.

Figure 1:
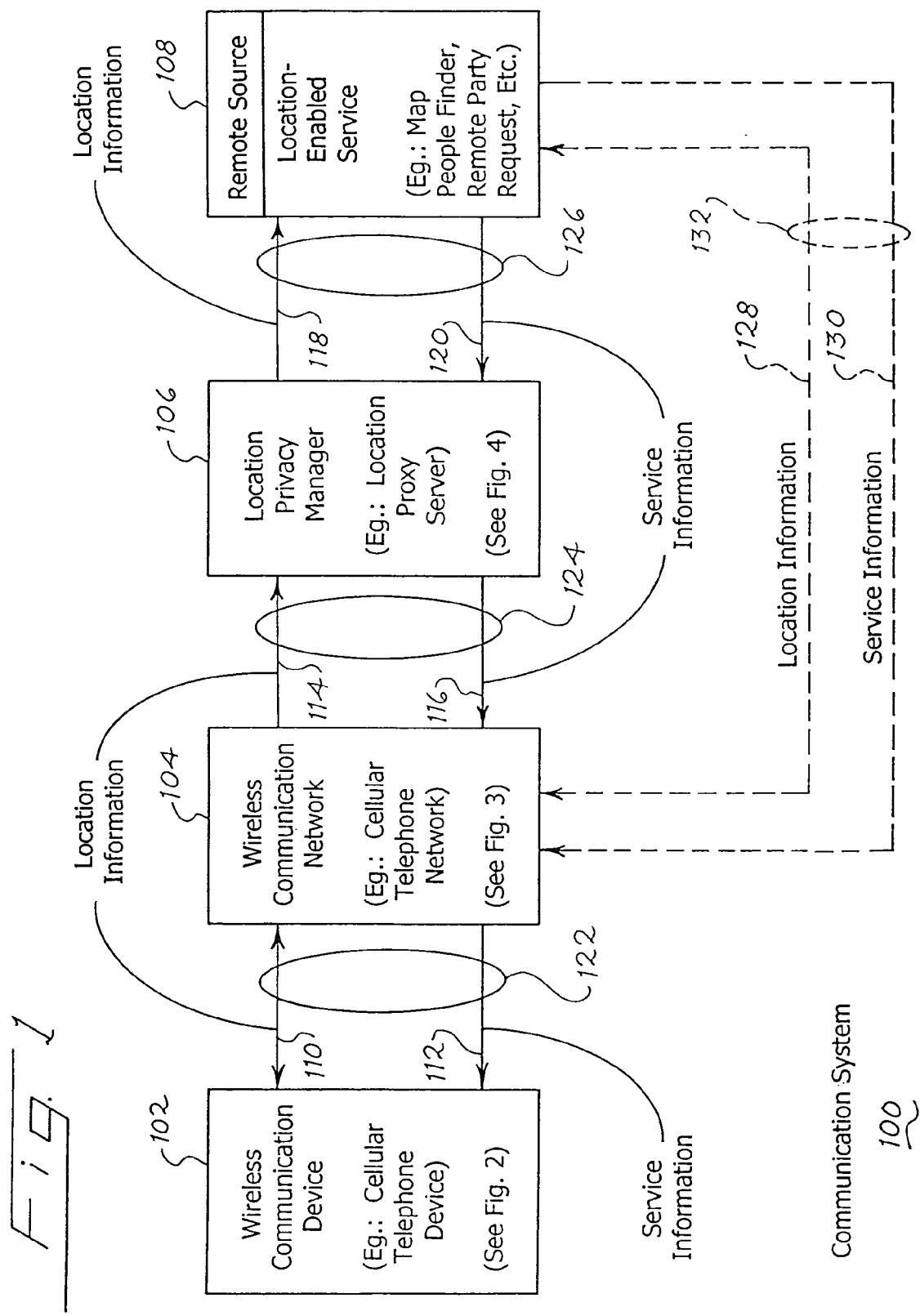
FIG. 1 illustrates a block diagram of a communication system, including a wireless communication device, a wireless communication network, a location privacy manager, and a remote source in accordance with a preferred embodiment of the present invention.

FIG. 1 illustrates a block diagram of a communication system 100, including a wireless communication device 102, a wireless communication network 104, a location privacy manager 106, and a remote source 108 in accordance with a preferred embodiment of the present invention. Location information is communicated between the blocks of FIG. 1 on paths 110, 114, 118, and 128. Service information is communicated between the blocks of FIG. 1 on paths 112, 116, 120 and 130. Pairs of paths 122, 124, 126 and 132 between adjacent blocks of FIG. 1 represent communication channels between the adjacent blocks.

In operation, the wireless communication device 102 communicates with the wireless communication network 104 over the communication channel 122. The wireless communication network 104 communicates with the location privacy manager over the communication channel 124. The location privacy manager 106 communicates with the remote source 108 over the communication channel 126. Alternatively, the remote source 108 communicates with the wireless communication network 104 over the communication channel 132.

The wireless communication device 102 is preferably a cellular telephone device. Alternatively, the wireless communication device 102 may include, without limitation, cordless telephones, personal digital assistants, pagers, personal notebooks, portable computers, two-way radios.

The wireless communication network 104 is preferably a cellular telephone network providing coverage over a relatively wide area, such as a city. Alternatively, the wireless communication network 104 may include, without limitation, wireless public branch exchange (PBX) communication networks, cordless telephone communication networks, small-cell or pico-cell communication networks, in-building communication networks, global satellite communication networks, paging communication networks and two-way radio networks.

The location privacy manager 106 preferably acts as a middleman or proxy server to monitor and manage communications between the wireless communication network 104 and the remote source 108. The location privacy manager 106 is preferably operated by a third party specializing in protecting the security and privacy of at least one of the identity and the location of the wireless communication device 102 when the wireless communication device 102 communicates with the remote source 108. Alternatively, the location privacy manager 106 may be an integral part of the wireless communication network 104.

The remote source 108 represents a third party person or service that is communicating with the wireless communication device 102. The remote source 108 preferably represents a location-enabled service adapted to provide location-based services to the wireless communication device 102. Such location-based services include, without limitation, a map service, a people finder service, a place finder service, to name a few. The remote source 108 is preferably operated by a third party, but may also be integrated with the location privacy manager 106 or the wireless communication network 104.

The communication channel 122 between the wireless communication device 102 and the wireless communication network 104 is preferably a radio frequency communication channel operating at cellular frequencies. Alternatively, the communication channel 122 operate at any other radio frequency in accordance with the design of the wireless communication device 102 and the wireless communication network 104. Alternatively, the communication channel 122 may include, without limitation, an infrared communication channel.

The communication channel 124 between the wireless communication network 104 and the location privacy manager 106 is preferably a wireline communication channel carried by a public switch telephone network (PSTN). Alternatively, the communication channel 124 may be a radio frequency communication channel or an infrared communication channel.

The communication channel 126 between the location privacy manager 106 and the remote source 108 is preferably a wireline communication channel carried by the PSTN. Alternatively, the communication channel 126 may be a radio frequency communication channel or an infrared communication channel.

The communication channel 132 between the remote source 108 and the wireless communication network 104 is preferably a wireline communication channel carried by the PSTN. Alternatively, the communication channel 132 may be a radio frequency communication channel or an infrared communication channel.

Figure 2:
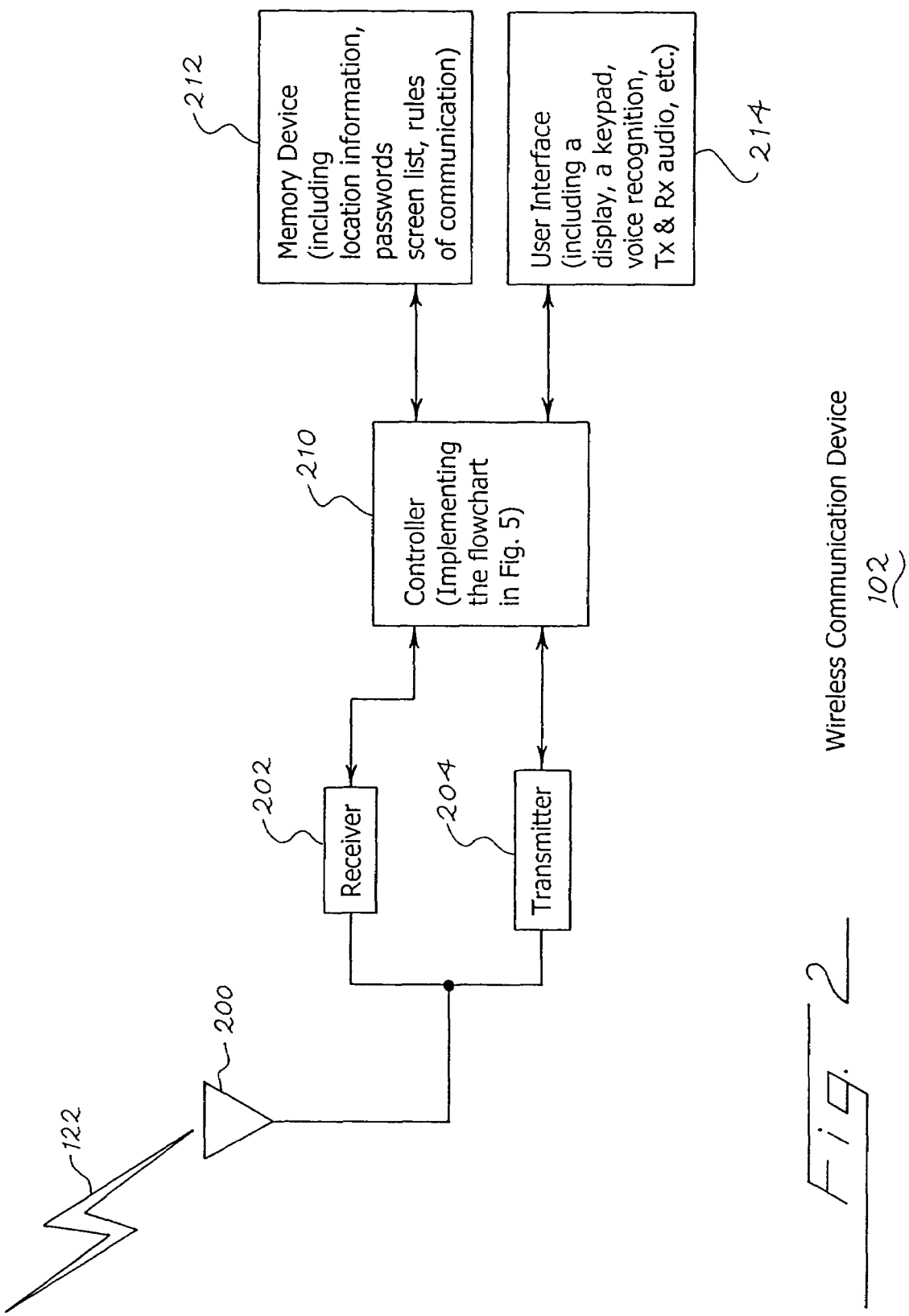
FIG. 2 illustrates a block diagram of the wireless communication device illustrated in FIG. 1 in accordance with a preferred embodiment of the present invention.

FIG. 2 illustrates a block diagram of the wireless communication device 102 illustrated in FIG. 1 in accordance with a preferred embodiment of the present invention. The wireless communication device 102 generally includes an antenna 200, a receiver 202, a transmitter 204, a memory device 212, a controller 210, and a user interface 214.

The antenna 200 communicates radio frequency signals over a radio frequency communication channel 122 between the wireless communication device 102 and a remote source 108. The receiver 202, coupled to the antenna 200, receives the radio frequency signals from the remote source 108. The transmitter 204, coupled to the antenna 200, transmits the radio frequency signals to the remote source 108. The memory device 212, coupled to the controller 210, stores rules of communication between the wireless communication device 102 and remote source 108, and stores an identity and a location of the wireless communication device 102. The controller 210, coupled to the receiver 202 and the transmitter 204, manages communications between the wireless communication device 102 and the remote source 108 to prohibit at least one of the identity and the location of the wireless communication device 102 from being known to the remote source 108 responsive to the rules of communication. The user interface 214, coupled to the controller 210, communicates user interface signals between a user of the wireless communication device 102 and the controller 210.

The general arrangement of the blocks in the wireless communication device 102 and the general functionality of the wireless communication device 102 are well known in the art, with exception of the method of FIG. 5 implemented in the controller 210 and the information stored in the memory device 212, as discussed further hereinbelow.

Figure 3:
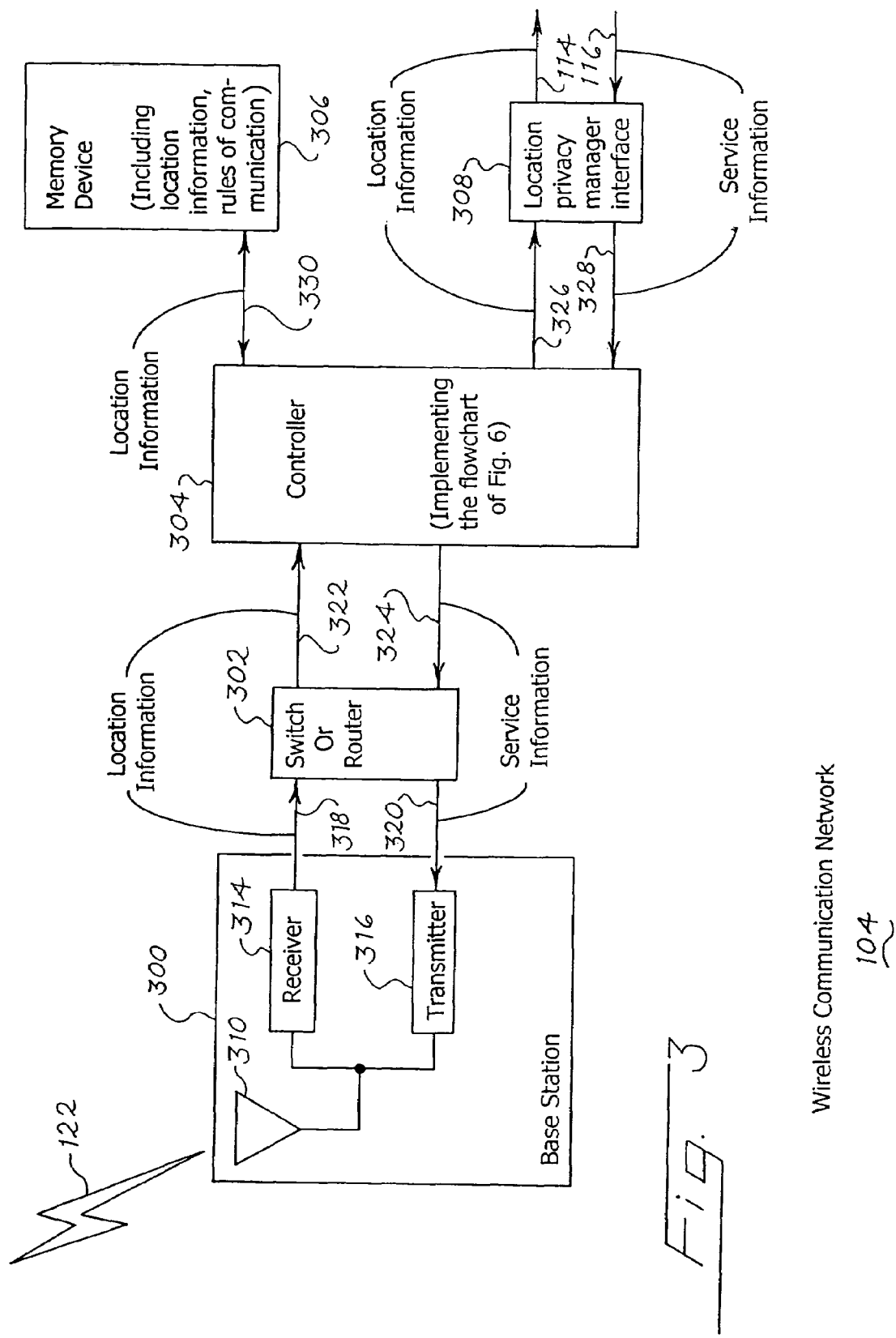
FIG. 3 illustrates a block diagram of the wireless communication network illustrated in FIG. 1 in accordance with a preferred embodiment of the present invention.

FIG. 3 illustrates a block diagram of the wireless communication network 104 illustrated in FIG. 1 in accordance with a preferred embodiment of the present invention. The wireless communication network 104 generally includes a base station 300, a communication switch or router 302, a memory device 306, a location privacy manager interface 308 and a controller 304. The base station 300 further includes an antenna 310, a receiver 314 and a transmitter 316.

The, antenna 310 communicates radio frequency signals over a radio frequency communication channel 122 between the wireless communication network 104 and a wireless communication device 102. The receiver 314, coupled to the antenna 310, receives the radio frequency signals from the wireless communication device 102. The transmitter 316, coupled to the antenna 310, transmits the radio frequency signals to the wireless communication device 102. The communication switch 302, coupled to the transmitter 316 and the receiver 314, routes information communicated over radio frequency communication channel 122. The memory device 306 stores rules of communication between the wireless communication device 102 and a remote source 108. The location privacy manager interface 308, coupled to the remote source 108, communicates signals between the wireless communication network 104 and the remote source 108. The controller 304, coupled to the communication switch 302, the memory device 306 and the location privacy manager interface 308, manages communications between the wireless communication device 102 and the remote source 108 to prohibit at least one of the identity and the location of the wireless communication device 102 from being known to the remote source 108 responsive to the rules of communication.

The location information of the wireless communication device 102 is transmitted over the paths 318, 322, 326, 330 and 114. The service information from the remote source 108 is transmitted over the paths 320, 324, 328 and 116.

The general arrangement of the blocks in the wireless communication network 104 and the general functionality of the wireless communication network 104 are well known in the art, with exception of the method of FIG. 6 implemented in the controller 304, the information stored in the memory device 306, and the location privacy manager interface 308, as discussed further hereinbelow.

Figure 4:
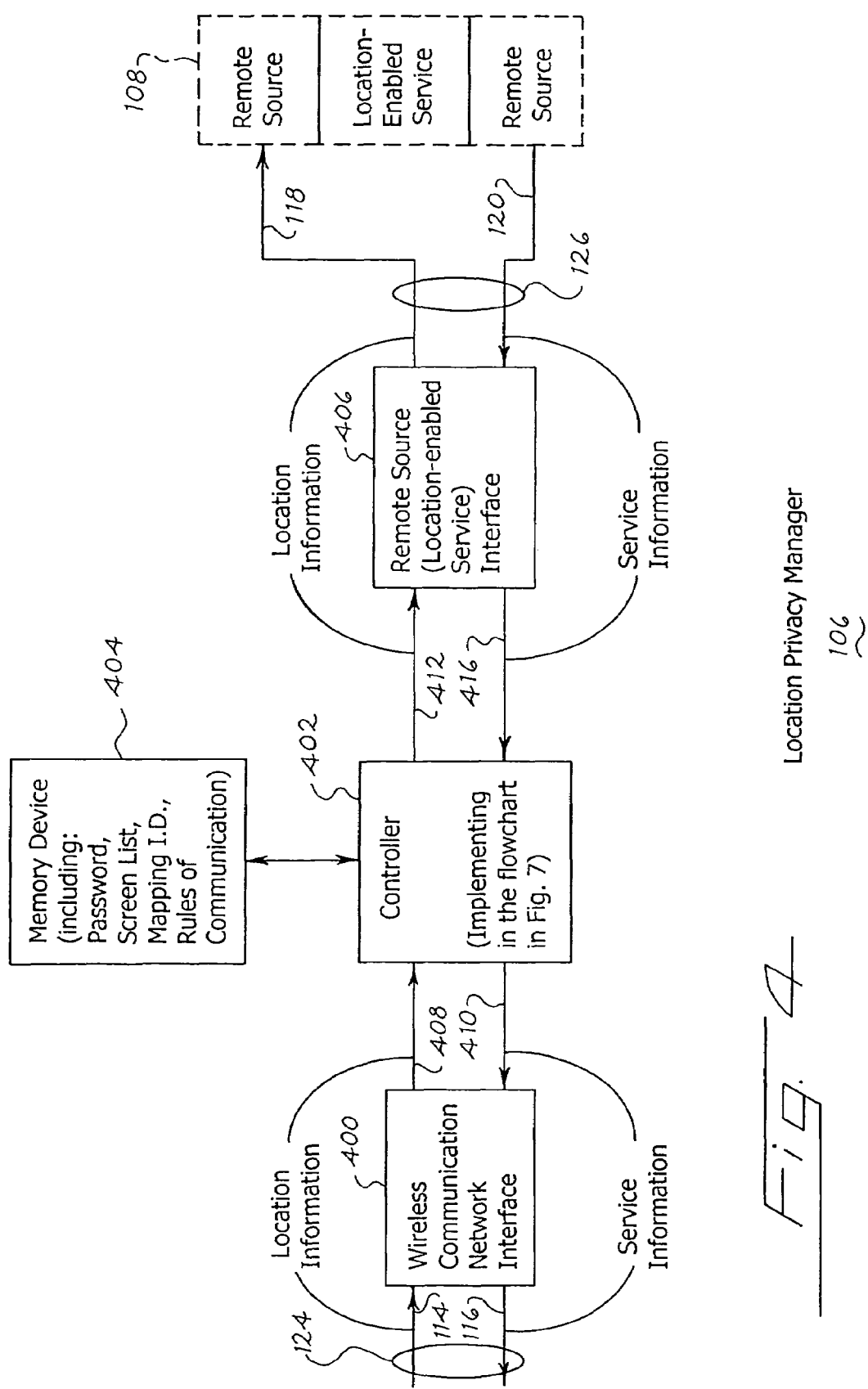
FIG. 4 illustrates a block diagram of the privacy location manager illustrated in FIG. 1 in accordance with a preferred embodiment of the present invention.

FIG. 4 illustrates a block diagram of the privacy location manager 106 illustrated in FIG. 1 in accordance with a preferred embodiment of the present invention. The location privacy manager 106 generally includes a wireless communication network interface 400, a remote source interface 406, a memory device 404 and a controller 402.

The wireless communication network interface 400 communicates signals between the location privacy manager 106 and a wireless communication network 104. The remote source interface 406 communicates signals between the location privacy manager 106 and a remote source 108. The memory device 404 stores rules of communication between a wireless communication device 102 and a remote source 108. The controller 402, coupled to the wireless communication network interface 400, the remote source interface 406, and the memory device 404, for managing communications between the wireless communication device 102 and the remote source 108 to prohibit at least one of an identity and a location of a wireless communication device 102, communicating with the wireless communication network 104, from being known to the remote source 108 responsive to the rules of communication. Each of the blocks in FIG. 4 and the contents thereof present features and advantages for the preferred embodiment of the present invention, as described further hereinbelow.

Figure 5:
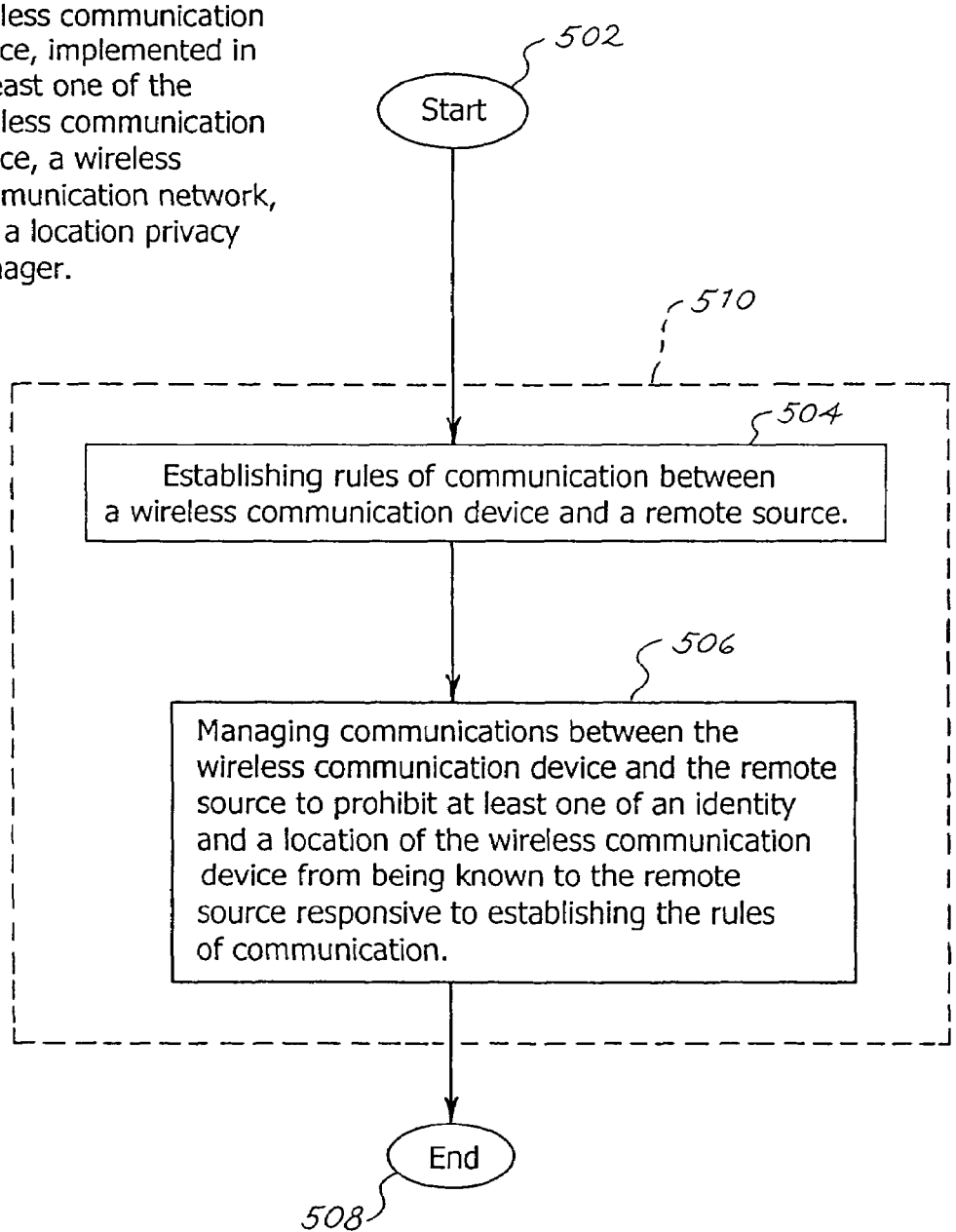
FIG. 5 illustrates a flowchart describing a method for providing privacy management for a wireless communication device performed by at least one of the wireless communication device illustrated in FIG. 2, the wireless communication network illustrated in FIG. 3 and the location privacy manager illustrated in FIG. 4 in accordance with a preferred embodiment of the present invention.

FIG. 5 illustrates a flowchart 500 describing a method for providing privacy management for a wireless communication device 102 performed by at least one of the wireless communication device 102 illustrated in FIG. 2, the wireless communication network 104 illustrated in FIG. 3 and the location privacy manager 106 illustrated in FIG. 4 in accordance with a preferred embodiment of the present invention.

At step 502, the method starts.

At step 504, the method establishes rules of communication between the wireless communication device and a remote source. The rules of communication may include any rule, but preferably include, without limitation, a password generated by the remote source 108, an identity of the remote source 108, an identity of a location privacy manager 106, and/or masking of the identity of the wireless communication device 102.

At step 506, the method manages communications between the wireless communication device 102 and the remote source 108 to prohibit at least one of an identity and a location of the wireless communication device 102 from being known to the remote source 108 responsive to the step 504 of establishing the rules of communication. Hence, a user of the wireless communication device 102 advantageously receives increased privacy and security during the operation of the wireless communication device 102 when communicating with the remote source 108.

At step 508, the method ends.

Step 510, indicated by dashed lines, represents a combination of steps 504 and 506. Step 510 identifies general language in the method of flowchart 500 that is expanded upon in the flowcharts of FIGS. 6, 7 and 8.

Figure 6:
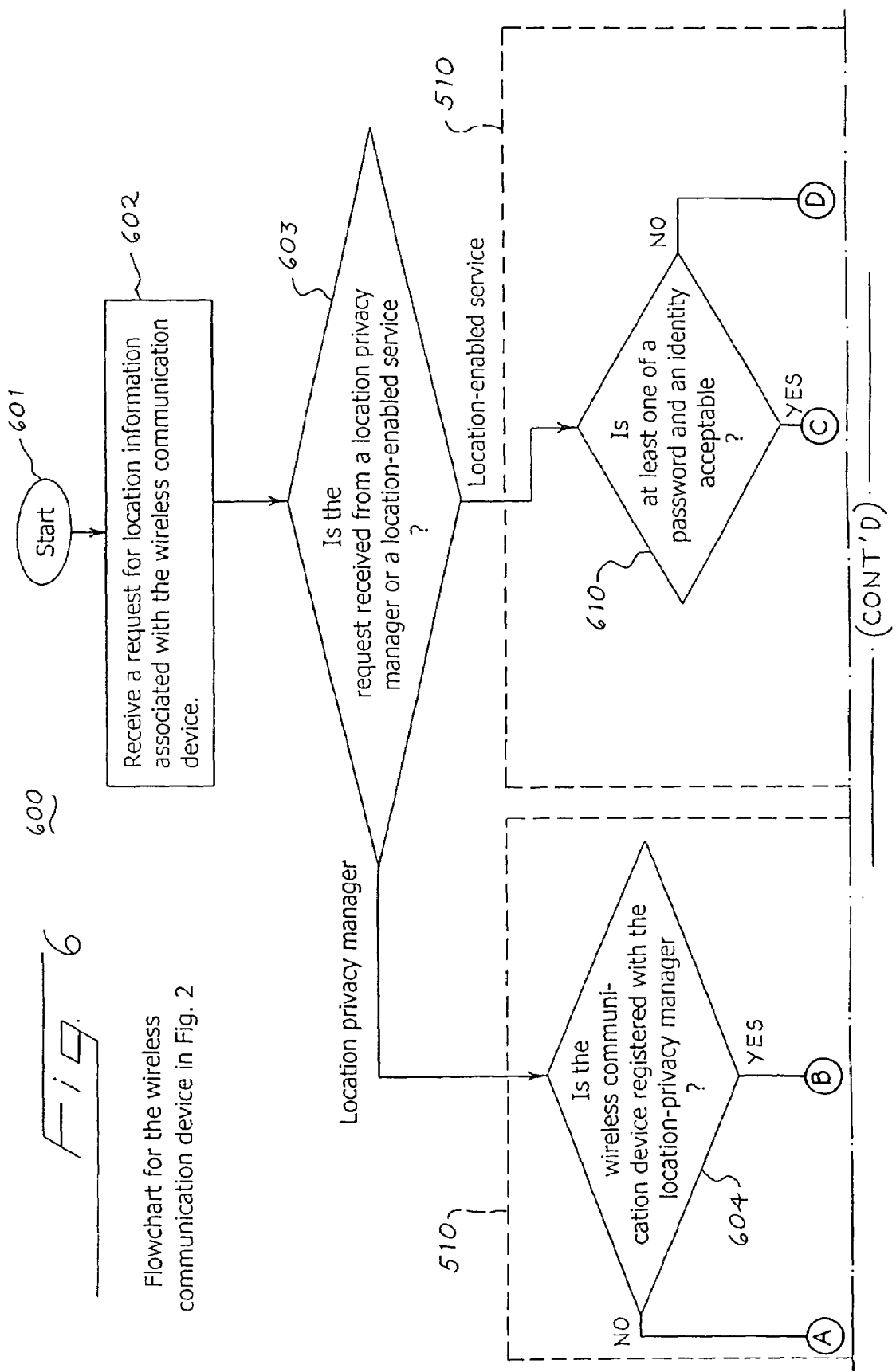
FIG. 6 illustrates a flowchart describing a method performed by the wireless communication device illustrated in FIG. 2 in accordance with a preferred embodiment of the present invention.

FIG. 6 illustrates a flowchart describing a method performed by the wireless communication device 102 illustrated in FIG. 2 in accordance with a preferred embodiment of the present invention.

At step 601 the wireless communication device 102 starts the method.

At step 602, the wireless communication device receives a request for location information associated with the wireless communication device.

At step 603, the wireless communication device determines whether the request is received from a location privacy manager 106 or a location-enabled service 108.

At step 604, the wireless communication device determines whether or not the wireless communication device 102 is registered to operate with the location privacy manager 106 responsive to the step of determining that the request is received from the location privacy manager 106.

At step 606, the wireless communication device 102 sends the location information to the location privacy manager 106 responsive to the step of determining that the wireless communication device 102 is registered to operate with the location privacy manager 106.

At step 608, the wireless communication device 102 rejects the request from the location privacy manager 106 responsive to the step of determining that that the wireless communication device 102 is not registered to operate with the location privacy manager 106.

At step 610, the wireless communication device 102 determines whether or not an identity of the location-enabled service 108 is acceptable to the wireless communication device 102 responsive to the step of determining that the request is received from the location-enabled service 108.

At step 612, the wireless communication device 102 sends the location information to the location-enabled service 108 responsive to the step of determining that the identity of the location-enabled service 108 is acceptable to the wireless communication device 102.

At step 614, the wireless communication device 102 rejects the request from the location-enabled service 108 responsive to the step of determining that that the identity of the location-enabled service 108 is not acceptable to the wireless communication device 102.

At step 616, the wireless communication device 102 ends the method.

Note that the dashed lines around steps 604, 606 and 608 and represented by reference number 510 represent that the language in steps 604, 606 and 608 is a narrowing of the language in the steps represented by 510 in FIG. 5. Similarly, the dashed lines around steps 610, 612 and 614 and also represented by reference number 510 represent that the language in steps 610, 612 and 614 is a narrowing of the language in the steps represented by 510 in FIG. 5.

Figure 7:
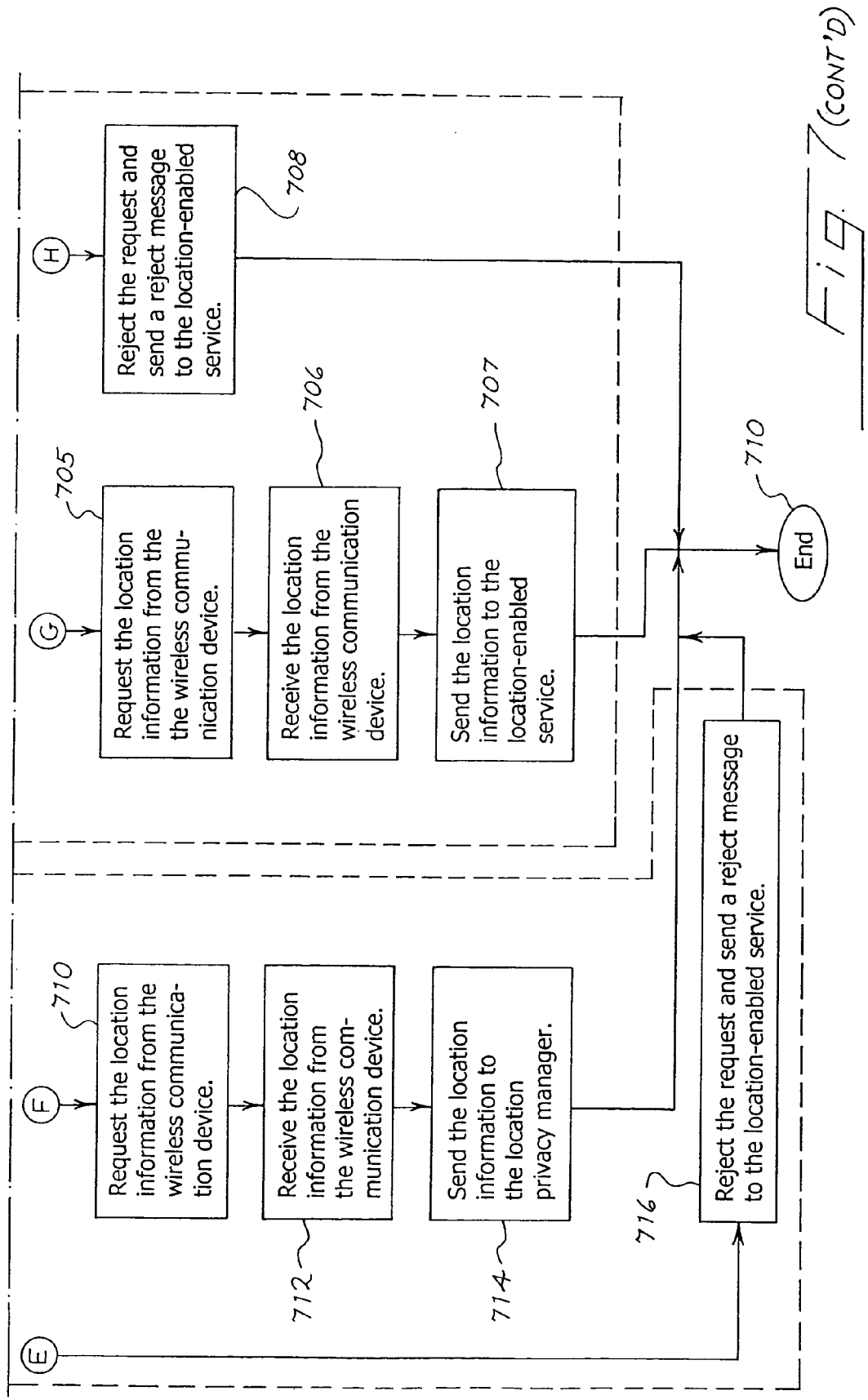
FIG. 7 illustrates a flowchart describing a method performed by the wireless communication network illustrated in FIG. 3 in accordance with a preferred embodiment of the present invention.

FIG. 7 illustrates a flowchart 700 describing a method performed by the wireless communication network 104 illustrated in FIG. 3 in accordance with a preferred embodiment of the present invention.

At step 701, the wireless communication network 104 starts the method.

At step 702, the wireless communication network 104 receives a request for location information associated with the wireless communication device 102.

At step 703, the wireless communication network 104 determines whether the request is received from a location privacy manager 106 or a location-enabled service 108.

At step 709, the wireless communication network 104 determines whether or not the wireless communication device 102 is registered to operate with the location privacy manager 106 responsive to determining that the request is received from the location privacy manager 106.

At step 710, the wireless communication network 104 sends a request for the location information to the wireless communication device 102 responsive to determining that the wireless communication device 102 is registered to operate with the location privacy manager 106.

At step 712, the wireless communication network 104 receives the location information from the wireless communication device 102 responsive to the step 710 of sending the request.

At step 714, the wireless communication network 104 sends the location information to the location privacy manager 106 responsive to the step 712 of receiving the location information.

At step 716, the wireless communication network 104 rejects the request from the location privacy manager 106 responsive to determining that that the wireless communication device 102 is not registered to operate with the location privacy manager 106.

At step 704, the wireless communication network 104 determines whether or not an identity of the location-enabled service 108 is acceptable to the wireless communication device 102 responsive to determining that the request is received from the location-enabled service 108.

At step 705, the wireless communication network 104 sends a request for the location information to the wireless communication device 102 responsive to determining that the identity of the location-enabled service 108 is acceptable to the wireless communication device 102.

At step 706, the wireless communication network 104 receives the location information from the wireless communication device 102 responsive to the step 705,of sending the request.

At step 707, the wireless communication network 104 sends the location information to the location-enabled service 108 responsive to the step 706 of receiving the location information.

At step 708, the wireless communication network 104 rejects the request from the location-enabled service 108 responsive to determining that that the identity of the location-enabled service 108 is not acceptable to the wireless communication device 102.

At step 718, the wireless communication network 104 ends the method.

Note that the dashed lines around steps 709, 710, 712 and 714 and represented by reference number 510 represent that the language in steps 709, 710, 712 and 714 is a narrowing of the language in the steps represented by 510 in FIG. 5. Similarly, the dashed lines around steps 704, 705, 706, 707 and 708 and also represented by reference number 510 represent that the language in steps 704, 705, 706, 707 and 708 is a narrowing of the language in the steps represented by 510 in FIG. 5.

FIG. 8 illustrates a flowchart 800 describing a method performed by the privacy location manager 106 illustrated in FIG. 4 in accordance with a preferred embodiment of the present invention.

At step 801, the location privacy manager 106 starts the method.

At step 802, the location privacy manager 106 determines whether a location-enabled service 108 is pulled by a wireless communication device 102 or pushed to the wireless communication device 102 by the location-enabled service 108.

At step 803, the location privacy manager 106 receives a request from the wireless communication device 102 for the location-enabled service 108 responsive to the step 802 of determining that the location-enabled service 108 is pulled by a wireless communication device 102.

At step 804, the location privacy manager 106 masks an identity of the wireless communication device 102 from the location-enabled service 108 responsive to the step 803 of receiving.

At step 805, the location privacy manager 106 requests location information from the wireless communication device 102 responsive to the step 804 of masking the identity.

At step 806, the location privacy manager 106 receives the location information from the wireless communication device 102 responsive to the step 805 of requesting the location information.

At step 807, the location privacy manager 106 sends the location information to the location-enabled service 108 without the identity of the wireless communication device 102 responsive to the step 806 of receiving the location information.

At step 808, the location privacy manager 106 receives a response from the location-enabled service 108 responsive to the step 807 of sending the location information.

At step 809, the location privacy manager 106 matches the response from the location-enabled service 108 to the identity of the wireless communication device 102 responsive to the step 808 of receiving.

At step 810, the location privacy manager 106 forwards the response from the location-enabled service to the wireless communication device 102 responsive to the step 809 of matching, without the location-enabled service 108 knowing the identity of the wireless communication device 102.

At step 811, the location privacy manager 106 receives a request for location information associated with the wireless communication device 102 from the location-enabled service responsive to the step 802 of determining that the location-enabled service 108 is pushed to the wireless communication device 102 by the location-enabled service 108.

At step 812, the location privacy manager 106 determines whether or not an identity of the location-enabled service 108 is acceptable to the wireless communication device 102 responsive to the step 811 of determining that the request is received from the location-enabled service 108.

At step 813, the location privacy manager 106 sends a request for the location information to the wireless communication device 102 responsive to determining that the identity of the location-enabled service 108 is acceptable to the wireless communication device 102.

At step 814, the location privacy manager 106 receives the location information from the wireless communication device 102 responsive to the step 813 of sending the request.

At step 815, the location privacy manager 106 sends the location information to the location-enabled service 108 responsive to the step 814 of receiving the location information.

At step 816, the location privacy manager 106 rejects the request from the location-enabled service 108 responsive to determining that that the identity of the location-enabled service 108 is not acceptable to the wireless communication device 102.

At step 817, the location privacy manager 106 ends the method.

Note that the dashed lines around steps 803-810 and represented by reference number 510 represent that the language in steps 803-810 is a narrowing of the language in the steps represented by 510 in FIG. 5. Similarly, the dashed lines around steps 811-816 and also represented by reference number 510 represent that the language in steps 811-816 is a narrowing of the language in the steps represented by 510 in FIG. 5.

Also note that the concept indicated initially by reference number 510 in FIG. 5 and then expanded upon in each of FIGS. 6, 7 and 8 is preferably implemented in one of FIGS. 6, 7 and 8. When privacy manager method represented by the steps of 510 are implemented in FIG. 6, this represents a wireless communication device-based solution. When privacy manager method represented by the steps of 510 are implemented in FIG. 7, this represents a wireless communication network-based solution. When privacy manager method represented by the steps of 510 are implemented in FIG. 8, this represents a location privacy manager-based solution. Each solution has its own inherent advantages depending upon where it is desirable to manage the communications between the wireless communication device 102 and the remote source 108.

In the preferred embodiment of the present invention, any feature described with reference to any drawing in the present application may be combined with any other feature described with reference to the same or any other drawing in the present application or the referenced co-pending application to provide multiple variations and combinations thereof.

Hence, while the present invention has been described with reference to various illustrative embodiments thereof, the present invention is not intended that the invention be limited to these specific embodiments. Those skilled in the art will recognize that variations, modifications and combinations can be made without departing from the spirit and scope of the invention as set forth in the appended claims.

What is claimed is:

1. A method for providing privacy management for a wireless communication device, the method comprising the steps of:

establishing rules of communication between the wireless communication device and a remote source; and managing communications between the wireless communication device and the remote source in response to establishing the rules of communication to:

(a) allow the remote source to know either an identity or a location of the wireless communication device while prohibiting the remote source from knowing both the identity and location of the wireless communication device in response to determining the wireless device approves of the remote source; and (b) prohibit the location of the wireless communication device from being known to the remote source in response to determining the wireless device does not approve of the remote source.

2. The method of claim 1 wherein the step of managing communications between the wireless communications device and the remote source comprises:

receiving a request for location information associated with the wireless communication device from the remote source;

determining whether the wireless communication device approves of the remote source in response to receiving the request for location information;

sending the location information to the remote source in response to determining that the wireless communication device approves of the remote source; and rejecting the request from the remote source in response to determining that the wireless communication device does not approve of the remote source.

3. The method of claim 2 wherein the remote source is a location privacy manager, the wireless communication device approves of the location privacy manager when the wireless communication device is registered to operate with the location privacy manager, and the wireless communication device does not approve of the location privacy manager when the wireless communication device is not registered to operate with the location privacy manager.

4. The method of claim 2 wherein the remote source is a location-enabled service, the wireless communication device approves of the location-enabled service when the wireless communication device accepts an identity of the location-enabled service, and the wireless communication device does not approve of the location-enabled service when the wireless communication device does not accept the identity of the location-enabled service.

5. The method of claim 2 wherein a wireless communication device manages communications between the wireless communications device and the remote source.

6. The method of claim I wherein the step of managing communications between the wireless communications device and the remote source comprises:

receiving a request for location information associated with the wireless communication device from the remote source;

determining whether the wireless communication device approves of the remote source in response to receiving the request for location information;

sending a request for the location information to the wireless communication device in response to determining that the wireless communication device approves of the remote source;

receiving the location information from the wireless communication device in response to sending the request for the location information to the wireless communication device;

sending the location information to the remote source in response to receiving the location information from the wireless communication device; and rejecting the request from the remote source in response to determining that the wireless communication device does not approve of the remote source.

7. The method of claim 6 wherein the remote source is a location privacy manager, the wireless communication device approves of the location privacy manager when the wireless communication device is registered to operate with the location privacy manager, and the wireless communication device does not approve of the location privacy manager when the wireless communication device is not registered to operate with the location privacy manager.

8. The method of claim 6 wherein the remote source is a location-enabled service, the wireless communication device approves of the location-enabled service when the wireless communication device accepts an identity of the location-enabled service, and the wireless communication device does not approve of the location-enabled service when the wireless communication device does not accept the identity of the location-enabled service.

9. The method of claim 6 wherein at least a wireless communication network or a location privacy manager manages communications between the wireless communications device and the remote source.

10. The method of claim 1 wherein the wireless communication device establishes the rules of communication and manages the communication between the wireless communications device and the remote source.

11. The method of claim 1 wherein a wireless communication network establishes the rules of communication and manages the communication between the wireless communications device and the remote source.

12. The method of claim 1 wherein a location privacy manager establishes the rules of communication and manages the communication between the wireless communications device and the remote source.

13. A method, performed by a location privacy manager, comprising:
    establishing rules of communication between a wireless communication device and a location-enabled service; and
    managing communications between a wireless communication device and a location-enabled service in response to establishing the rules of communication to:
        (a) allow the location-enabled service to know either an identity or a location of the wireless communication device while prohibiting the location-enabled service from knowing both the identify and location of the wireless communication device in response to determining the wireless device approves of the location-enabled service; and
        (b) prohibit the location of the wireless communication device from being known to the location-enabled service in response to determining the wireless device does not approve of the remote source.

14. A wireless communication network comprising:
    an antenna for communicating radio frequency signals over a radio frequency communication channel between the wireless communication network and a wireless communication device;
    a receiver, coupled to the antenna, for receiving the radio frequency signals from the wireless communication device;
    a transmitter, coupled to the antenna, for transmitting the radio frequency signals to the wireless communication device;
    a communication switch, coupled to the transmitter and the receiver, for routing information communicated over radio frequency communication channel;
    a memory device for storing rules of communication between the wireless communication device and a remote source;
    a location privacy manager interface, coupled to the remote source, for communicating signals between the wireless communication network and the remote source; and
    a controller, coupled to the communication switch, the memory device and the location privacy manager interface, for managing communications between the wireless communication device and the remote source in response to the rules of communication to:
        (a) allow the remote source to know either an identity or a location of the wireless communication device while prohibiting the remote source from knowing both the identify and location of the wireless communication device in response to determining the wireless communication device approves of the remote source; and
        (b) prohibit the location of the wireless communication device from being known to the remote source in response to determining the wireless communication device does not approve of the remote source.

15. A method for providing privacy management for a wireless communication device, the method comprising the steps of:
    establishing rules of communication between the wireless communication device and a remote source; and
    managing communications between the wireless communication device and the remote source to prohibit the remote source from knowing both an identity and a location of the wireless communication device;
    wherein the rules of communication further comprise:
        a rule that the wireless communication device shall only communicate with the remote source having an acceptable identity, and
    wherein the step of managing the communications further comprises the steps of:
        receiving a request for location information associated with the wireless communication device from the remote source responsive to the remote source being pushed to the wireless communication device by the remote source;
        determining whether or not an identity of the remote source is acceptable to the wireless communication device responsive to the step of determining that the request is received from the remote source;
        sending a request for the location information to the wireless communication device responsive to determining that the identity of the remote source is acceptable to the wireless communication device;
        receiving the location information from the wireless communication device responsive to the step of sending the request;
        sending the location information to the remote source responsive to the step of receiving the location information; and
        rejecting the request from the remote source responsive to determining that the identity of the remote source is not acceptable to the wireless communication device.

16. The method of claim 15 wherein at least a wireless communication network or a location privacy manager provides the privacy management for the wireless communications device.

17. A method, performed by a location privacy manager, comprising the steps of:
- establishing rules of communication between a wireless communication device and a location-enabled service; and
- managing communications between a wireless communication device and a location-enabled service to prohibit the location-enabled service from knowing both an identity and a location of the wireless communication device;
- wherein the rules of communication further comprise:
  - a rule that the wireless communication device shall only communicate with the location-enabled service having an acceptable identity, and
- wherein the step of managing the communications further comprises the steps of:
  - receiving a request for location information associated with the wireless communication device from the location-enabled service responsive to the location-enabled service being pushed to the wireless communication device by the location-enabled service;
  - determining whether or not an identity of the location-enabled service is acceptable to the wireless communication device responsive to the step of determining that the request is received from the location-enabled service;
  - sending a request for the location information to the wireless communication device responsive to determining that the identity of the location-enabled service is acceptable to the wireless communication device;
  - receiving the location information from the wireless communication device responsive to the step of sending the request;
  - sending the location information to the location-enabled service responsive to the step of receiving the location information; and
  - rejecting the request from the location-enabled service responsive to determining that the identity of the location-enabled service is not acceptable to the wireless communication device.

* * * * *